United States Patent [19]

Chung et al.

[11] Patent Number: 5,624,569

[45] Date of Patent: Apr. 29, 1997

[54] CLARIFICATION OF DEINKING PROCESS WATER

[75] Inventors: Daniel K. Chung, Burlington, Canada; Manian Ramesh, Lisle; Karen R. Tubergen, Mt. Prospect, both of Ill.

[73] Assignee: NALCO Chemical Company, Naperville, Ill.

[21] Appl. No.: 589,095

[22] Filed: Jan. 23, 1996

[51] Int. Cl.$^6$ .................................................... C02F 1/56
[52] U.S. Cl. ............................ 210/727; 162/5; 210/732; 210/733; 210/734; 210/735; 210/928
[58] Field of Search ............................ 162/5; 210/725, 210/727, 728, 734, 735, 917, 928, 732, 733

[56] References Cited

U.S. PATENT DOCUMENTS

| | | | |
|---|---|---|---|
| 3,624,019 | 11/1971 | Anderson et al. | 260/29.6 H |
| 4,151,202 | 4/1979 | Hunter et al. | 526/310 |
| 4,715,962 | 12/1987 | Bhattacharyya et al. | 210/708 |
| 4,801,388 | 1/1989 | Fong et al. | 210/701 |
| 4,929,655 | 5/1990 | Takeda et al. | 524/458 |
| 5,006,590 | 4/1991 | Takeda et al. | 524/458 |
| 5,013,456 | 5/1991 | St. John | 210/734 |
| 5,120,797 | 6/1992 | Fong et al. | 525/329.4 |
| 5,207,924 | 5/1993 | Reed et al. | 210/734 |
| 5,435,922 | 7/1995 | Ramesh et al. | 210/928 |
| 5,476,522 | 12/1995 | Kerr et al. | 210/734 |
| 5,527,431 | 6/1996 | Shetty et al. | 162/164.4 |
| 5,560,832 | 10/1996 | Sivakumar et al. | 210/708 |

*Primary Examiner*—Peter A. Hruskoci
*Attorney, Agent, or Firm*—Robert A. Miller; James J. Drake; Patricia A. Charlier

[57] ABSTRACT

The invention is a method for clarifying ink-containing effluent water from recycled paper production which comprises the step of adding a water-soluble, surface active, silicon-containing polyelectrolyte polymer coagulant to the ink-containing effluent water from recycled paper production, wherein the polymer has from 0.01 to 10 mole percent of a vinyl alkoxysilane monomer. A preferred silicon-containing polyelectrolyte polymer is the product of a free radical synthesis from vinyltrimethoxysilane and diallyldimethylammoniumchloride monomers.

12 Claims, No Drawings

CLARIFICATION OF DEINKING PROCESS WATER

FIELD OF THE INVENTION

The invention is a method for clarifying ink-containing effluent water from recycled paper production which comprises the step of adding a water-soluble, surface active, silicon-containing polyelectrolyte polymer coagulant to the ink-containing effluent water from recycled paper production, wherein the polymer has from 0.01 to 10 mole percent of a vinyl alkoxysilane monomer. A preferred silicon-containing polyelectrolyte polymer is the product of a free radical synthesis from vinyltrimethoxysilane and diallyldimethylammoniumchloride monomers.

BACKGROUND OF THE INVENTION

The production of recycled fiber has become an important element of the pulp and paper business. Advances in the technology of printing as well as the broadening of the scope of recyclable printed material present new challenges for recyclers. Thus, innovations in the deinking process must address the problems created by novel inks and print media. For example, the water-based inks which have evolved for use in flexographic newspaper: printing present difficulties for recycling in that residual ink of this nature which passes through the deinking process causes a reduction in the brightness of recycled paper.

Conventional deinking (such as that used for newsprint deinking) is comprised of three distinct steps. First the ink is removed, or separated, from the paper fiber. This usually occurs while the waste paper is being repulped in water and is routinely aided by caustic and surfactant. Secondly, the separated ink is dispersed to a small particle size. The dispersion step usually occurs concomitantly with the separation step. In the third step, the dispersed ink is usually separated from the repulped fiber slurry by washing or flotation.

Efficient deinking demands both a successful separation of ink from the fiber and a successful separation of the ink dispersion from the fiber slurry. A deinking process that successfully separates the ink from the fiber and successfully disperses the ink into the aqueous phase of the slurry as small particles will be inadequate if thereafter it does not provide effective removal of the ink from the fiber slurry. Dispersed ink particles that are carried along with the fiber in the slurry will in some degree be retained on the fiber during paper formation, resulting in a general gray hue or distinct spots, and commonly a low brightness.

Large volumes of water are required for the ink removal process. Clean-up of the ink laden process water is typically accomplished by a solid/liquid separation unit operation, such as Dissolved Air Flotation (DAF). Since recycle mills are frequently located in metropolitan areas, a great emphasis is placed on maintaining a closed water cycle in the mill. Effective clean-up of the DAF influent is important, for residual ink remaining in the water may be reintroduced to the fibers, resulting in a loss of brightness to the final sheet.

Clarification chemicals are typically used in conjunction with DAF units to remove the suspended solids from the deinking process waters. Often, deinking process waters have a large anionic character which requires the use of a dual polymer program for effective clean-up. A dual polymer treatment generally comprises a low molecular weight cationic coagulant in combination with a high molecular weight flocculant. Typical cationic coagulants are poly (diallyldimethylammoniumchloride), amphoteric diallyldimethylammoniumchloride containing copolymers, condensation polymers of ethylene dichloride/ammonia or dimethylamine/epichlorohydrin. Acrylamide-based flocculants have been utilized to assist in the solid/liquid separation. Both anionic and cationic flocculants can be employed.

It is common to coagulate the suspended solids contained in the deinking process waters by using as a coagulant a water soluble cationic polymer. One of the polymers that has met with some success is polydiallyldimethylammoniumchloride, hereafter poly (DADMAC). One of the drawbacks in using this coagulant is that it is relatively expensive and the dosages necessary to effectuate good coagulation are often excessive. If it were possible to provide a more effective coagulant other than poly(DADMAC), an improved clarification of waste deinking process waters would be afforded.

Noteworthy attempts which have improved the efficiency of diallyldimethylammoniumchloride as a deinking agent are disclosed in U.S. Pat. Nos. 4,715,962, 5,013,456 and 5,207,924. These patents show that certain amphoteric copolymers of diallyldimethylammoniumchloride with anionic monomers, such as acrylic acid, improve efficiency of poly(DADMAC) as a deinking water coagulant.

SUMMARY OF THE INVENTION

The invention is a method for clarifying ink-containing effluent water from recycled paper production which comprises the step of adding a water-soluble, surface active, silicon-containing polyelectrolyte polymer coagulant to the ink-containing effluent water from recycled paper production, wherein the polymer has from 0.01 to 10 mole percent of a vinyl alkoxysilane monomer. A preferred silicon-containing polyelectrolyte polymer is the product of a free radical synthesis from vinyltrimethoxysilane and diallyldimethylammoniumchloride monomers.

DESCRIPTION OF THE INVENTION

The present inventors have developed a new class of coagulants which exhibit enhanced performance for the clarification of ink-containing effluent water from recycled paper production. These coagulants are copolymers of DADMAC and trialkoxysilanes.

The invention is a method for clarifying ink-containing effluent water from recycled paper production which comprises the step of adding an effective deinking amount of a water-soluble, surface active, silicon-containing polyelectrolyte polymer coagulant to the ink-containing effluent water from recycled paper production wherein the polymer made by free radical polymerization comprises:

A. from 0.01 to 10 mole percent of a vinyl alkoxysilane monomer; and

B. from 90 to 99.99 mole percent of a second monomer selected from the group consisting of acrylamide, acrylic acid and its alkali metal salts, dimethylaminoethyl (propyl) acrylate methyl chloride quaternary, diallyldimethylammoniumchloride, maleimide, vinyl formamide, vinyl acetate, itaconic acid, maleic anhydride, fumaric acid, aconic acid, acrylamido methyl propane sulfonic acid and its alkali metal salts, $C_6$–$C_{20}$ alkyl esters of acrylic acid, phenethyl ester of acrylic acid, nonyl-α-benzyl ester of acrylic acid, dimethyl acrylamide, diethyl acrylamide, tributyl acrylamide, dimethylaminoethylacrylate benzyl chloride quaternary, 3-methylacrylamide propyl trimethyl ammonium chloride, acrylamidomethyl butanoic acid and combinations thereof.

The effluent waters are preferably treated with coagulants and optionally with flocculants. It has been discovered that surface charge neutralization of ink particles in the materials to be recycled can be enhanced by the use of a copolymer which has been modified to incorporate a certain degree of hydrophobicity. Such a modification can be accomplished by copolymerizing a diallyldimethylammonium halide, particularly diallyldimethylammoniumchloride (DADMAC) with vinyl alkoxysilane, preferably vinyltrimethoxysilane.

The vinyl alkoxysilane monomers useful in the copolymer composition of the invention contain an alkyl group of from 1–4 carbon atoms. As such vinyl trimethoxy, triethoxy, tripropoxy and tributoxysilanes, and combinations thereof, may find use in the subject invention. While vinyl trialkoxysilanes are preferred, the monomers may be mono or di-substituted as well, or mixtures of mono-, di- and trialkoxy substituted silanes may be used. A preferred vinyl trialkoxysilane for use in this invention is vinyltrimethoxysilane, commercially available from Hüls America, Piscataway, N.J. and Dow Corning Corporation; Midland, Mich.

Useful vinylalkoxysilanes may include vinyltrimethoxysilane, vinyltriethoxysilane, vinyltris(β-methoxyethoxy)silane, vinyltriacetoxysilane, allyltrimethoxysilane, allyltriacetoxysilane, vinylmethyldimethoxysilane, vinyldimethoxyethoxysilane, vinylmethyldiacetoxysilane, vinyldimethylacetoxysilane, vinylisobutyldimethoxysilane, vinyltriisopropoxysilane, vinyltri-n-butoxysilane, vinyltrisecbutoxysilane, vinyltrihexyloxysilane, vinylmethoxydihexyloxysilane, vinyldimethoxyoctyloxysilane, vinylmethoxydioctyloxysilane, vinyltrioctyloxysilane, vinylmethoxydilauryloxysilane, vinyldimethoxylauryloxysilane, vinylmethoxydioleyloxysilane, vinyldimethoxyoleyloxysilane, and polyethyleneglycol-modified vinylsilane.

Diallyldimethylammonium halides, especially diallyldimethylammoniumchloride (DADMAC) are well-known and commercially available from a variety of sources. One method for the preparation of DADMAC is detailed in U.S. Pat. No. 4,151,202, the disclosure of which is hereinafter incorporated by reference into this specification.

The mole ratio of DADMAC to the vinyl trialkoxysilane ranges from 99.99:0.01 to 90:10. Most preferably, the mole ratio of DADMAC to the vinyl trialkoxysilane range from 99.99:0.01 to 95.0:5.0.

The polymers may be prepared as in conventional vinyl polymerization techniques. These techniques include conventional solution polymerization in water, and polymerization in water-in-oil emulsion form, such as that described in U.S. Pat. No. 3,624,019, the disclosure of which is hereinafter incorporated by reference into this specification. The polymers of the invention may also be prepared in so-called dispersion form, such as that described in U.S. Pat. Nos. 4,929,655 and 5,006,590 the disclosures of which is also hereinafter incorporated by reference into this specification. The polymers of the instant invention may be in solid, dispersion, latex or solution form.

Conventional free radical catalysis may be used, including both free radical initiators and redox systems. Such polymerizations are within the purview of those skilled in the art and as such will not be elaborated on in this specification.

The molecular weights of the copolymer prepared hereunder can vary greatly. Generally, copolymers of diallyldimethylammoniumchloride and vinyltrimethoxysilane produced hereunder will have a molecular weight of from 50,000 to 5,000,000, and preferably 75,000 to 2,500,000, and most preferably from 100,000 to 1,000,000. The polymers of this invention will accordingly have a reduced specific viscosity for a one percent by weight polymer solution as measured in one molar sodium nitrate of from 0.1–4 dl/gm and preferably from 0.5–3.0 dl/gm. A most preferred reduced specific viscosity range is from 0.8–2.5 dl/gm. While discussed herein as copolymers of diallyldimethylammonium halides and vinyl alkoxysilanes, other monomers may be incorporated into the resultant polymers without detracting from the spirit and intent of the invention. Possible monomers that may be incorporated include, but are not limited to nonionic and cationic vinyl monomers. These materials are exemplified by acrylamide, and such cationic monomers as dimethylaminoethylmethacrylate and dimethylaminoethyl acrylate and their respective water soluble quaternary amine salts.

The copolymers of this invention may be used alone, or in combination with a high molecular weight anionic, cationic or non-ionic water soluble or dispersible flocculant. Such polymers include polyacrylamide, and copolymers of acrylamide with acrylic acid and its water soluble alkali metal or ammonium salts. As used herein, the term acrylic acid is meant to encompass such water soluble salts. Also useful are such polymers as sulfo-methylated acrylamides as exemplified in U.S. Pat. Nos. 5,120,797 and 4,801,388, the disclosures of which are hereinafter incorporated by reference into this specification. Other commercially available anionic flocculant materials may also be utilized.

A preferred class of flocculants for use in this invention includes copolymers of acrylamide and acrylic acid having a mole ratio of acrylamide to acrylic acid of from 99:1 to 1:99 and preferably 99:1 to 50:50. Most preferably, the mole ratio of acrylamide to acrylic acid will be 95:5 to 60:40. An especially preferred flocculant for use in this invention has a mole ratio of acrylamide to acrylic acid of about 70:30.

The flocculants of this invention may be prepared in solution form, or in water-in-oil emulsion form. The preparation of such flocculants is known to those skilled in the art. The flocculants generally have molecular weights ranging from as low as 1,000,000 to 40,000,000 or higher. Preferred flocculants have a molecular weight of about 10,000,000. The upper limit of molecular weight is not critical so long as the polymer is water soluble or dispersible.

The flocculant is believed to cause the aggregation of the neutralized colloidal particles which are suspended in the effluent water. Aggregation is the result of either entrapping agents (i.e., inorganic flocculants) or bonding agents (i.e., organic flocculants) bringing the neutralized particles together.

The copolymer of diallyldimethylammoniumchloride and vinyltrialkoxysilane is generally added to the effluent water at a rate of 0.25–100 ppm (on an actives basis), based on the weight of deinking process water. A preferred dosage range is 0.5–75 ppm with a most preferred range being 1–50 ppm. The amount of coagulant will vary according to the particular effluent stream and it is understood that routine experimentation in any particular case will be required to ascertain the optimum dosage. Flocculant may also be added in an effective amount, generally between about 0.5–10 ppm. The polymers of the invention are preferably added to the system in solution form prior to the DAF unit while the flocculants are added to the DAF unit following dissolved air injection.

The optimal amounts of the various components required for effectiveness in this invention depend on the type of inks present in the process waters. For the most part, recycled papers are printed with hydrophobic, oil-based letter press or offset inks. These printing inks consist of high viscosity mineral oils, carbon black, specialty additives, and colophonium derivatives and/or alkylated resins as binders. A growing percentage of materials are printed with water-based (flexographic) inks. Flexographic inks utilize acrylic resins as their binders. As such, these resins become soluble under typical deinking operations and behave quite differently from the conventional oil-based inks during the recycling process. This poses a significant problem for water clarification treatments. In addition, the concentration of the combined components varies greatly and can depend upon the conditions such as temperature pH and the amount of suspended solids.

The present invention can best be understood by reference to the following working and comparative examples.

EXAMPLE 1

A 90:10 mole copolymer of diallyldimethylammoniumchloride (DADMAC) and vinyltrimethoxysilane (VTMS), at 20% actives, was prepared for use as a coagulant. The following reactants were used to form the hydrophobically modified polyelectrolyte copolymer coagulant:

| | | |
|---|---|---|
| 312.91 | grams | Diallydimethylammoniumchloride DADMAC (a 58% Solution) |
| 18.89 | grams | Vinyltrimethoxysilane (a 98% Solution) |
| 200.0 | grams | Deionized Water |
| 1.80 | grams | [2,2'-Azobis (2-amidinopropane)] Dihydrochloride Initiator |
| 20.0 | grams | Sodium Chloride |
| 446.20 | | Final Dilution Water |
| 0.1 | grams | Versene |

A semi-batch process was used to prepare the DADMAC/VTMS copolymer.

A 1.5 L reactor equipped with a mechanical stirrer a thermocouple, nitrogen inlet/outlet tubes, condenser and two syringe pumps was set up. Vinyltrimethoxysilane was taken in the first pump set at a delivery rate of 4.5 cc/hr. The second pump contained an aqueous solution of 2,2' azobis (2-amidinopropane) dihydrochloride (1.2 g in 48.8 g DI water), and the pump was set at 12.5 cc/hr.

The DADMAC, sodium chloride, and Versene were charged into a polymerization reactor and heated to 52° C. The reaction mixture was purged with nitrogen. VTMS and initiator-containing pumps were started and the polymerization was allowed to proceed.

A thick polymer started forming after about 2 hours. At the end of two and a half hours, the viscosity increased to a point where continued agitation was difficult. 200 ml of deionized water was then added. The reaction continued for a period of 5 hours, and then subjected to a post treatment at 82° C. for 5 hours.

Product phase separated in two days and indicated extensive crosslinking as shown below:

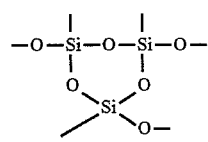

The phase-separated product swelled in water, yet was water-insoluble.

EXAMPLE 2

A 99.5/0.5 mole ratio copolymer of diallyldimethylammoniumchloride (DADMAC) and vinyltrimethoxysilane (VTMS), at 20% actives, was prepared for use as a coagulant. The following reactants were used to form the hydrophobic polyelectrolyte copolymer coagulant:

| | | |
|---|---|---|
| 321.13 | grams | DADMAC (a 62% Solution) |
| 1.00 | grams | VTMS (a 98% Solution) |
| 0.2 | grams | Versene |
| 258.8 | grams | Deionized Water |
| 1.20 | grams | 2,2'-Azobis [2(2-imdazolin-2yl) propane Dihydrochloride Initiator |
| 61.00 | grams | Sodium Chloride |
| 356.87 | grams | Dilution Water |

A batch process was used to prepare the DADMAC/VTMS copolymer. A reactor similar to the one described in Example 1 was used.

The DADMAC, VTMS, Versene, sodium chloride and deionized water were charged into a polymerization reactor at a temperature of 58° C. Thereafter, the initiator (0.6 grams in 49.4 grams deionized water) was charged into the reactor dropwise via a syringe pump at 12.5 cc/hour.

A thick polymer started forming after about 1.0 hour. At the end of 1.5 hours, the mixture was difficult to stir. At this point, deionized water addition was started using a syringe pump set at 70 ml/hour. The reaction continued for a period of 5.5 hours. After that, initiator (0.6 grams in 19.4 grams of deionized water) was added.. The reactor was heated to 82° C. and held at that temperature for 3 hours. The reaction product was then diluted with 356.87 grams of water and stored. Reduced specific viscosity and intrinsic viscosity measurements were determined on a 1% polymer solution in NaNO₃ (sodium nitrate) and found to be 2.02/1.3 dl/gm respectively.

EXAMPLE 3

A 99.0/1.0 mole ratio DADMAC/VTMS copolymer was prepared using the procedure of Example 2. 2.0 g of VTMS and 355.07 g of DI water were used in place of the amounts in Example 2. All other quantities were the same. RSV/IV for a 1% by weight solution of the polymer in sodium nitrate were 2.2/1.2 dl/g, respectively.

EXAMPLE 4

A 99.0/1.0 mole ratio copolymer of diallyldimethylammoniumchloride (DADMAC) and vinyltrimethoxysilane (VTMS), at 20% actives, was prepared for use as a coagulant. The following reactants were used to form the silicon containing polyelectrolyte copolymer coagulant:

| | |
|---|---|
| DADMAC (monomer) 39.8% solution | 497.20 g |
| VTMS (vinyltrimethoxysilane) | 2.00 g |
| Versene | 0.20 g |
| Ammonium Persulfate (APS) | 3.90 g |
| Deionized Water | 20.00 g |
| Ammonium Persulfate (APS) | 1.90 g |
| Deionized Water | 20.0 g |
| Dilution Water | 195.00 g |
| Final Water | 262.90 g |
| Sodium bisulfite | 1.00 g |
| | 1,000.00 g |

1. Versene, and DADMAC monomer were taken in a conventional polymer reactor as described in Example 1.

2. The reactor was heated to 57° C. under constant $N_2$ purging, and stirred at 400 rpm.
3. VTMS was added immediately followed by the APS solution (2.0g in 20 g water).
4. The reactor was held at 57° C. for 3 hours. During this period, dilution water (195 g) was added at a rate of 65 g/hr.
5. The reactor was then heated to 82° C.; and a solution of APS (0.97 g) in water (10 g) was added.
6. After holding at 82° C. for 2 hours, the reactor was cooled to room temperature. Sodium bisulfite was added to prevent degradation to the reactor and mixed for 15 min.
7. The product was transferred into a storage container.

Reduced specific viscosity and intrinsic viscosity measurements were determined on a 1% polymer solution in $NaNO_3$ (sodium nitrate) and found to be 1.6 and 0.9 dl/gm respectively. This material is hereinafter referred to as Example 4.

EXAMPLE 5

Experimentation was performed on samples of recycled furnish effluent from a North American paper mill. 200 ml mill samples were taken from the DAF unit for analysis by the jar test.

The 200 ml sample of effluent is added to a 1000 ml jar. Next, the mixture was stirred at 200 rpm and the coagulant polymer to be tested was added. After stirring for two and a half minutes, a high molecular weight flocculant is added to the jar, and stirring is continued for another 30 seconds. Subsequently, the stirring speed is reduced to 20 rpm and the mixture is stirred for 2 minutes. After this five minute sequence, stirring is ceased and the mixture is allowed to settle for 5 minutes. A 3 ml aliquot is removed from the supernatant in the jar and turbidity was measured on a Hach P 2100 turbidimeter. Results are reported in units of NTU. The smaller the number, the less turbid the system is, and thus the more effective the polymeric treatment for deinking is.

The above-mentioned method was utilized to obtain the results of Table I. No flocculant was utilized in conjunction with the coagulant. The data shows that the polymer of the instant invention was as effective as the conventional treatment, though a much smaller amount of the polymer of the instant invention was required to obtain the comparable result. Therefore, the poly(DADMAC/VTMS) is more efficient at clarification.

TABLE I

| Coagulant | Dosage (ppm) Actives Basis | Turbidity (NTU) |
| --- | --- | --- |
| None | None | >1000 |
| Polymer A | 5 | 82 |
| Polymer A | 10 | 75 |
| Polymer A | 15 | 79 |
| Polymer A | 20 | 71 |
| Example 4 | 1 | 201 |
| Example 4 | 2 | 97 |
| Example 4 | 3 | 79 |
| Example 4 | 4 | 65 |

Polymer A = poly(epichlorohydrin/dimethylamine), linear

EXAMPLE 6

The procedure described in Experiment 5 was utilized to obtain the results of Table II. No flocculant was utilized in conjunction with the coagulant. These results also illustrate the efficiency of the poly(DADMAC/VTMS) for purposes of deinking water clarification. If polymer A and Example 4 are compared, comparable reduction in turbidity which indicates a greater amount of clarification is only obtained when a larger amount of polymer A is utilized. Example 4 gives equivalent turbidity reduction at a much lower dosage. Polymer B is a solution poly(DADMAC) with an IV of 0.8–1.2 dL/g, so that for comparison purposes, polymer B and Example 4 have similar viscosities. If polymer B and Example 4 are compared at equivalent dosages, it is apparent that better results are obtained through the utilization of the polymers of the instant invention.

TABLE II

| Coagulant | Dosage (ppm) Actives Basis | Turbidity (NTU) |
| --- | --- | --- |
| None | None | >1000 |
| Polymer A | 5 | 92 |
| Polymer A | 7.5 | 81 |
| Example 4 | 2 | 113 |
| Example 4 | 3 | 90 |
| Polymer B | 2 | 130 |
| Polymer B | 3 | 122 |

Polymer A = poly(epichlorohydrin/dimethylamine), linear
Polymer B = poly(diallyldimethylammoniumchloride)

EXAMPLE 7

The experimental procedure described in Example 5 was utilized to obtain the results of Table III. At comparable dosages, the poly(DADMAC/VTMS) provided greater turbidity reduction. Without any treatment, the turbidity of the deinking process water was greater than 1000.

TABLE III

| Coagulant | Flocculant | Order of Addition | Dosage (ppm) Actives Basis Cat-Floc | Turbidity (NTU) |
| --- | --- | --- | --- | --- |
| Polymer A | Polymer C | Cat/Floc | 5/0.75 | 65 |
| Example 4 | Polymer C | Cat/Floc | 2/0.75 | 90 |
| Polymer B | Polymer C | Cat/Floc | 2/0.75 | 111 |
| Polymer A | Polymer C | Cat/Floc | 7.5/0.75 | 49 |
| Example 4 | Polymer C | Cat/Floc | 3/0.75 | 64 |
| Polymer B | Polymer C | Cat/Floc | 3/0.75 | 95 |

Polymer A = poly(epichlorohydrin/dimethylamine), linear
Polymer B = poly(diallyldimethylammoniumchloride)
Polymer C = poly(acrylic acid/acrylamide), 30:70 mole ratio

What is claimed:

1. A method for clarifying ink-containing effluent water from recycled paper production which comprises the steps of A.) of adding an effective deinking amount of a water-soluble, surface active, silicon-containing polyelectrolyte polymer coagulant made by free radical polymerization to the ink-containing effluent water from recycled paper production wherein the polymer comprises:

from 0.01 to 10 mole percent of a vinyl alkoxysilane monomer; and from 90 to 99.99 mole percent of a second monomer selected from the group consisting of acrylamide, acrylic acid and its alkali metal salts, dimethylaminoethyl (propyl) acrylate methyl chloride quaternary, diallyldimethylammoniumchloride, maleimide, vinyl formamide, vinyl acetate, itaconic acid, maleic anhydride, fumaric acid, aconic acid, acrylamido methyl propane sulfonic acid and its alkali metal salts, $C_6$–$C_{20}$ alkyl esters of acrylic acid, phenethyl ester of acrylic acid, nonyl-α-benzyl ester of acrylic acid, dimethyl acrylamide, diethyl acrylamide, tributyl acrylamide, dimethylaminoethylacrylate benzyl chloride quaternary, 3-methylacrylamide propyl trimethyl ammonium chloride, acrylamidomethyl butanoic acid and combinations thereof;

B. allowing coagulation of the ink; and

C. separating the coagulated ink to obtain clarified effluent water.

2. The method of claim 1 wherein the vinyl alkoxysilane monomer is selected from the group consisting of vinyltrimethoxysilane and vinyl triethoxysilane and the second monomer is diallyldimethylammoniumchloride.

3. The method of claim 2 wherein the vinyl alkoxysilane monomer is vinyltrimethoxysilane.

4. The method of claim 3 wherein the water-soluble, surface active, silicon-containing polyelectrolyte polymer is added to said ink-containing effluent water in an amount from about 0.25 to about 100 ppm.

5. The method of claim 3 wherein the water-soluble, surface active, silicon-containing polyelectrolyte polymer is added to said ink-containing effluent water in an amount from about 0.5 to about 75 ppm.

6. The method of claim 3 wherein the water-soluble, surface active, silicon-containing polyelectrolyte polymer is added to said ink-containing effluent water in an amount from about 1 to about 50 ppm.

7. The method of claim 3 wherein the reduced specific viscosity of the water-soluble, surface active, silicon-containing polyelectrolyte polymer in one molar sodium nitrate solution for one percent polymer actives is from 0.1 to 4 dl/gm.

8. The method of claim 3 wherein the reduced specific viscosity of the water-soluble, surface active, silicon-containing polyelectrolyte polymer in one molar sodium nitrate solution for one percent polymer actives is from 0.5 to 3 dl/gm.

9. The method of claim 3 wherein the reduced specific viscosity of the water-soluble, surface active, silicon-containing polyelectrolyte polymer in one molar sodium nitrate solution for one percent polymer actives is from 0.8 to 2.5 dl/gm.

10. The method of claim 3 wherein the mole ratio of diallyldimethylammoniumchloride to vinyltrimethoxysilane ranges from 99.99:0.01 to 95.0:5.0.

11. The method of claim 3 further comprising the addition of a flocculant to said effluent water.

12. The method of claim 11 wherein said flocculant is a copolymer of acrylamide and acrylic acid.

* * * * *